United States Patent
Seo et al.

(10) Patent No.: US 9,936,408 B2
(45) Date of Patent: *Apr. 3, 2018

(54) COMMUNICATION METHOD IN CONSIDERATION OF CARRIER TYPES AND APPARATUS FOR SAME

(71) Applicant: LG ELECTRONICS INC., Seoul (KR)

(72) Inventors: Hanbyul Seo, Anyang-si (KR); Byounghoon Kim, Anyang-si (KR); Suckchel Yang, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/296,754

(22) Filed: Oct. 18, 2016

(65) Prior Publication Data

US 2017/0099610 A1 Apr. 6, 2017

Related U.S. Application Data

(63) Continuation of application No. 14/379,583, filed as application No. PCT/KR2013/001636 on Feb. 28, 2013, now Pat. No. 9,515,761.

(60) Provisional application No. 61/604,525, filed on Feb. 29, 2012, provisional application No. 61/614,522, filed on Mar. 23, 2012, provisional application No.
(Continued)

(51) Int. Cl.
*H04W 4/00* (2009.01)
*H04W 24/08* (2009.01)
*H04J 11/00* (2006.01)
*H04L 5/00* (2006.01)
*H04W 88/02* (2009.01)

(52) U.S. Cl.
CPC ......... *H04W 24/08* (2013.01); *H04J 11/0056* (2013.01); *H04L 5/001* (2013.01); *H04L 5/005* (2013.01); *H04L 5/0092* (2013.01); *H04W 88/02* (2013.01)

(58) Field of Classification Search
None
See application file for complete search history.

(56) References Cited

U.S. PATENT DOCUMENTS

2008/0298524 A1* 12/2008 Koorapaty .......... H04L 25/0228
375/348
2010/0061333 A1* 3/2010 Marsh ................. H04W 72/082
370/330

(Continued)

FOREIGN PATENT DOCUMENTS

WO 2010128816 A2 11/2010

*Primary Examiner* — Kwang B Yao
*Assistant Examiner* — Juvena Loo
(74) *Attorney, Agent, or Firm* — Dentons US LLP

(57) ABSTRACT

The present invention relates to a wireless communication system. In particular, the present invention relates to a method for a terminal to receive a downlink signal in a wireless communication system and to an apparatus for same, the method comprising the steps of: receiving, from a base station, a first piece of information indicating the start point of a multicast broadcast single frequency network (MBSFN) signal, receiving an MBSFN subframe having a plurality of orthogonal frequency division multiplexing (OFDM) symbols, and receiving the MBSFN signal from an OFDM symbol indicated by the first piece of information in the MBSFN subframe.

16 Claims, 13 Drawing Sheets

Case 1: Frequency band of LCT is overlapped with that of NCT
Case 2: Frequency band of LCT is not overlapped with that of NCT

Related U.S. Application Data

61/648,571, filed on May 17, 2012, provisional application No. 61/699,832, filed on Sep. 11, 2012.

(56) References Cited

U.S. PATENT DOCUMENTS

| | | |
|---|---|---|
| 2010/0317343 A1* | 12/2010 | Krishnamurthy ......... G01S 1/30 |
| | | 455/435.1 |
| 2010/0322135 A1 | 12/2010 | Van Lieshout et al. |
| 2011/0038436 A1* | 2/2011 | Kim ....................... H04B 7/024 |
| | | 375/260 |
| 2011/0267997 A1 | 11/2011 | Seo et al. |
| 2011/0319025 A1 | 12/2011 | Siomina et al. |
| 2012/0002591 A1 | 1/2012 | Noh et al. |
| 2012/0039233 A1 | 2/2012 | Kim et al. |
| 2012/0120893 A1* | 5/2012 | Baligh .................. H04W 24/02 |
| | | 370/329 |
| 2012/0276916 A1* | 11/2012 | Kazmi .................. G01S 5/0205 |
| | | 455/452.1 |
| 2014/0357255 A1 | 12/2014 | Jonsson et al. |

* cited by examiner

Case 1: Frequency band of LCT is overlapped with that of NCT
Case 2: Frequency band of LCT is not overlapped with that of NCT

COMMUNICATION METHOD IN CONSIDERATION OF CARRIER TYPES AND APPARATUS FOR SAME

This application is a continuation of U.S. application Ser. No. 14/379,583, filed on Aug. 19, 2014, now allowed, which is a 371 national stage entry of International Application No. PCT/KR2013/001636, filed Feb. 28, 2013, and claims the benefit of U.S. Provisional Application No. 61/604,525, filed on Feb. 29, 2012, U.S. Provisional Application No. 61/614,522, filed on Mar. 23, 2012, U.S. Provisional Application No. 61/648,571, filed on May 17, 2012, and U.S. Provisional Application No. 61/699,832, filed on Sep. 11, 2012 all of which are incorporated by reference in their entirety herein.

TECHNICAL FIELD

The present invention relates to a communication method in the case that a plurality of carrier types are used in a wireless communication system and an apparatus for the same. In more detail, the present invention relates to a method for transmitting and receiving a signal considering types of carriers, a signaling method, a method for configuring a subframe, and an apparatus for the same. In this case, the wireless communication system includes a system that supports carrier aggregation.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple system (MC-FDMA). In a wireless communication system, a user equipment may receive information from a base station through a downlink (DL), and may also transmit information to the base station through an uplink (UL). Examples of information transmitted from and received by the user equipment include data and various kinds of control information. Various physical channels exist depending on types and usage of information transmitted from or received by the user equipment.

DISCLOSURE

Technical Problem

An object of the present invention devised to solve the conventional problem is to provide a method for efficiently performing communication in the case that a plurality of carrier types are used in a wireless communication system and an apparatus for the same. Another object of the present invention is to provide a method for transmitting and receiving a signal considering types of carriers, a signaling method, a method for configuring a subframe, and an apparatus for the same.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one aspect of the present invention, a method for enabling a user equipment to receive a downlink signal in a wireless communication system comprises the steps of receiving, from a base station, first information indicating a start point of a multicast broadcast single frequency network (MBSFN) signal; receiving an MBSFN subframe having a plurality of orthogonal frequency division multiplexing (OFDM) symbols; and receiving the MBSFN signal from an OFDM symbol indicated by the first information on the MBSFN subframe.

In another aspect of the present invention, a user equipment used in a wireless communication system comprises a radio frequency (RF) unit: and a processor, wherein the processor is configured to receive, from a base station, first information indicating a start point of a multicast broadcast single frequency network (MBSFN) signal, receive an MBSFN subframe having a plurality of orthogonal frequency division multiplexing (OFDM) symbols, and receive the MBSFN signal from an OFDM symbol indicated by the first information on the MBSFN subframe.

Preferably, an operation for receiving a control channel signal at the MBSFN subframe is skipped if the MBSFN subframe is received through a first type carrier, and an operation for receiving the control channel signal at the MBSFN subframe is further performed if the MBSFN subframe is received through a second type carrier.

Preferably, the control channel signal is received from the first OFDM symbol of the MBSFN subframe if the MBSFN subframe is received through the second type carrier.

Preferably, the control channel signal is received from the first OFDM symbol of the MBSFN subframe, and the MBSFN signal is received from Nth OFDM symbol, N being an integer greater than 2.

Preferably, a normal cyclic prefix (CP) is applied from the first OFDM symbol to N−1th OFDM symbol, and an extended CP is applied to the Nth OFDM symbol and following OFDM symbols.

Preferably, if the MBSFN subframe is received through the second type carrier and a resource block (RB) set for receiving the MBSFN signal and RB set for monitoring to receive the control channel signal are overlapped with each other at one or more RBs, the operation for receiving the control channel signal is skipped at the overlapped one or more RBs.

Advantageous Effects

According to the embodiments of the present invention, communication may be performed efficiently in the case that a plurality of carrier types are used in a wireless communication system. Also, signal transmission and reception, signaling and subframe configuration may be performed efficiently considering types of carriers.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Configurations, operations, and other features of the present invention will be understood readily by the preferred embodiments of the present invention, examples of which are illustrated in the accompanying drawings. The embodiments of the present invention may be used for various wireless access technologies such as CDMA (code division multiple access). FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A $3^{rd}$ generation partnership project long term evolution (3GPP LTE) is a part of an evolved UMTS (E-UMTS) that uses E-UTRA. LTE-advanced (LTE-A) is an evolved version of the 3GPP LTE.

Although the following embodiments will be described based on that technical spirits of the present invention are applied to the 3GPP system, it is to be understood that the 3GPP system is exemplary and the technical spirits of the present invention are not limited to the 3GPP system.

Although the present invention is disclosed on the basis of the LTE-A system, conception on suggestions of the present invention or suggested methods of the present invention and their embodiments may be applied to another system (for example, IEEE 802.16m system), which uses multiple carriers, without limitation.

Figure 1:
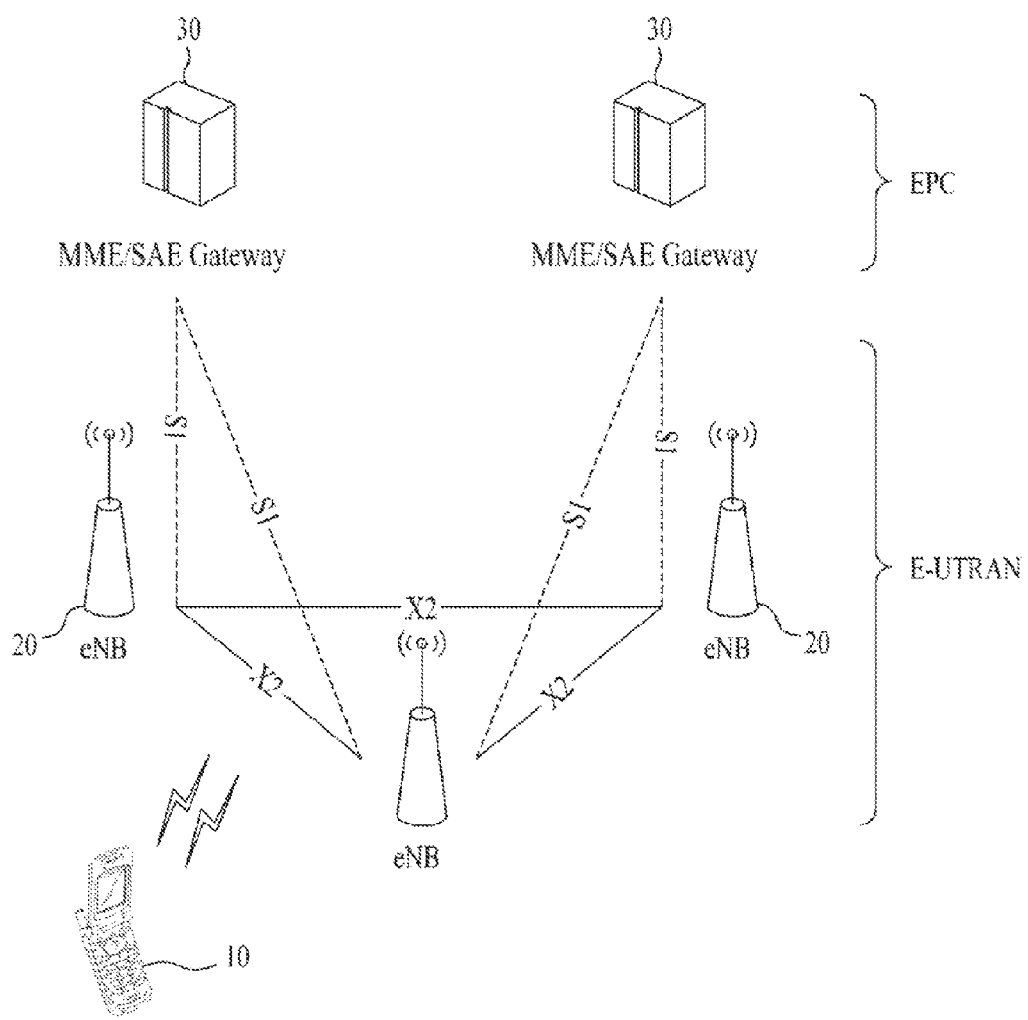
FIG. 1 is a diagram illustrating a network structure of an Evolved Universal Mobile Telecommunications System (E-UMTS)

FIG. 1 is a diagram illustrating a network structure of an Evolved Universal Mobile Telecommunications System (E-UMTS). The E-UMTS refers to an LTE system. A communication network is widely arranged and provides various communication services such as voice and packet data.

Referring to FIG. 1, the E-UMIT network includes an E-UTRAN (Evolved Universal Terrestrial Radio Access Network), an EPC (Evolved Packet Core), and a user equipment (UE). The E-UTRAN may include one or more base stations (eNode B; eNB) 20, and one or more user equipments 10 may be arranged in one cell. A mobility management entity/system architecture evolution (MME/SAE) gateway 30 is arranged at the end of the network and may be connected with an external network. A downlink refers to communication from the base station 20 to the user equipment 10, and an uplink refers to communication from the user equipment to the base station.

The user equipment 10 is a communication device carried by a user, and the base station 20 is a fixed station that generally performs communication with the user equipment. The base station 20 provides an end point of a user plane and a control plane to the user equipment 10. One base station 20 may be arranged per cell. An interface for transmitting user traffic or control traffic may be used between the base stations 20. The MME/SAE gateway 30 provides an end point of a session and mobility management function to the user equipment 10. The base station 20 and the MME/SAE gateway 30 may be connected with each other through an interface S1.

The MME provides various functions that include distribution of a paging message to the base stations 20, security control, idle state mobility control, SAE bearer control, and encryption and integrity protection of non-access layer (NAS) signaling. The SAE gateway host provides various functions that include end of a plane packet and user plane switching for mobility support of the user equipment 10. The MME/SAE gateway 30 simply refers to a gateway in this specification. However, the MME/SAE gateway 30 includes both MME gateway and SAE gateway.

A plurality of nodes may be connected between the base station 20 and the gateway 30 through the interface S1. The base stations 20 may mutually be connected with each other through an interface X2, and neighboring base stations may have a mesh network structure having interface X2.

Figure 2:
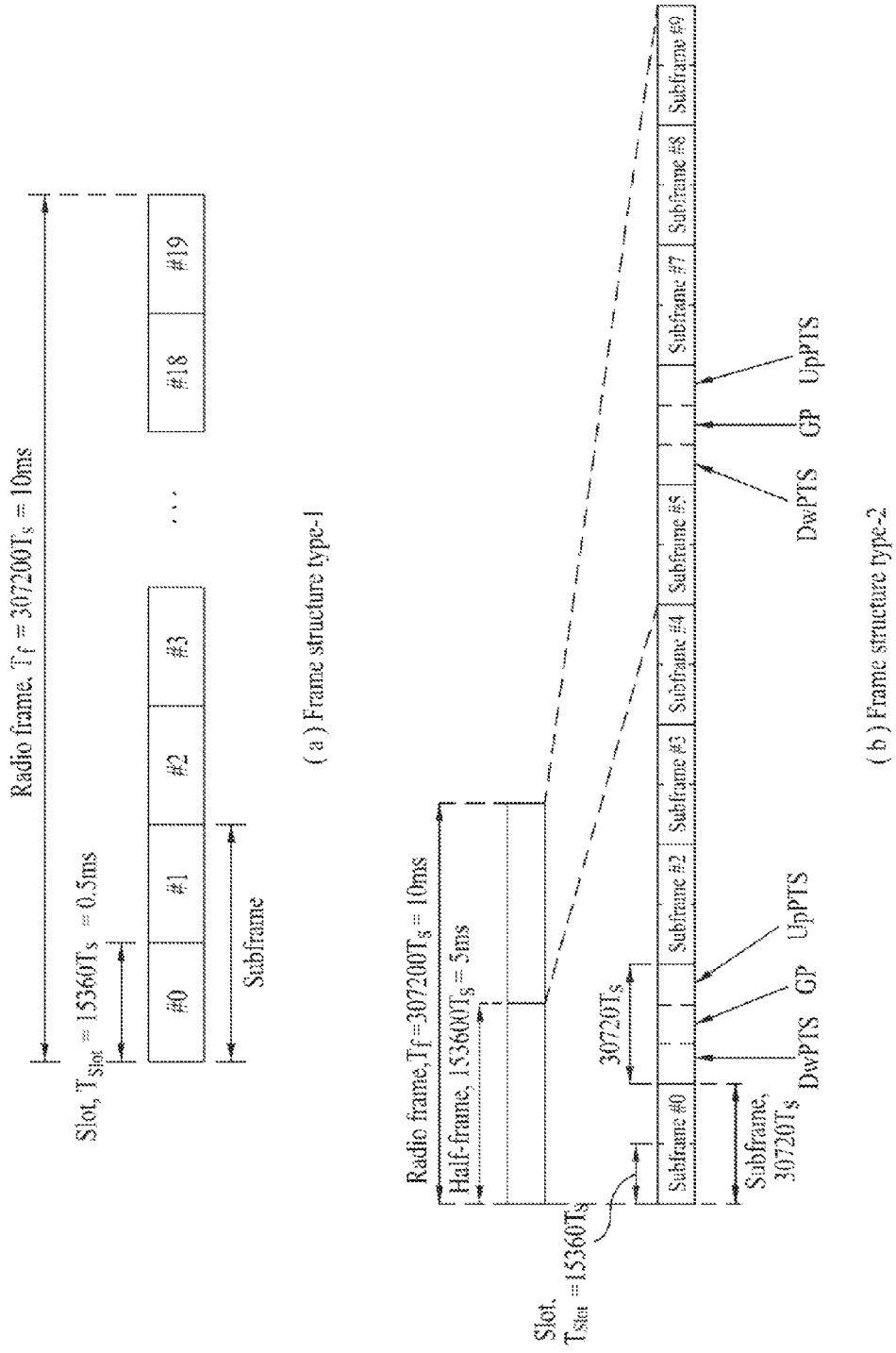
FIG. 2 is a diagram illustrating a structure of a radio frame used in an LTE(-A) system.

FIG. 2 is a diagram illustrating a structure of a radio frame used in an LTE(-A) system.

Referring to FIG. 2, a radio frame has a length of 10 ms ($327200 \times T_s$) and includes ten (10) subframes of an equal size. Each sub frame has a length of 1 ms and includes two slots of 0.5 ms. $T_s$ represents a sampling time, and is expressed by $T_s = 1/(15 \text{ kHz} \times 2048) = 3.2552 \times 10^{-8}$ (about 33 ns). The slot includes a plurality of orthogonal frequency division multiplexing (OFDM) symbols or single carrier-frequency division multiple access (SC-FDMA) symbols in a time domain, and includes a plurality of resource blocks (RBs) in a frequency domain. In the LTE(-A) system, one resource block includes twelve (12) subcarriers×seven (or six) OFDM symbols or SC-FDMA symbols. The number of OFDM symbols included in the resource block/subframe may be varied depending on a length of a cyclic prefix (CP). Examples of the CP include a normal CP and an extended CP, and the extended CP is set to be longer than the normal CP. In this case, in case of the normal CP, the resource block and the subframe respectively include 7 and 14 OFDM symbols. In case of the extended CP, the resource block and the subframe respectively include 6 and 12 OFDM symbols. A frame structure type-1 and a frame structure type-2 are respectively used for FDD (Frequency Division Duplex) and TDD (Time Division Duplex). The frame structure type-2 includes two half frames, each of which includes five subframes and a downlink pilot time slot (DwPTS), a guard period (GP), and an uplink pilot time slot (UpPTS). The aforementioned structure of the radio frame is only exemplary, and various modifications may be made in the number/length of subframes, slots or OFDM (or SC-FDMA) symbols.

Figure 3:
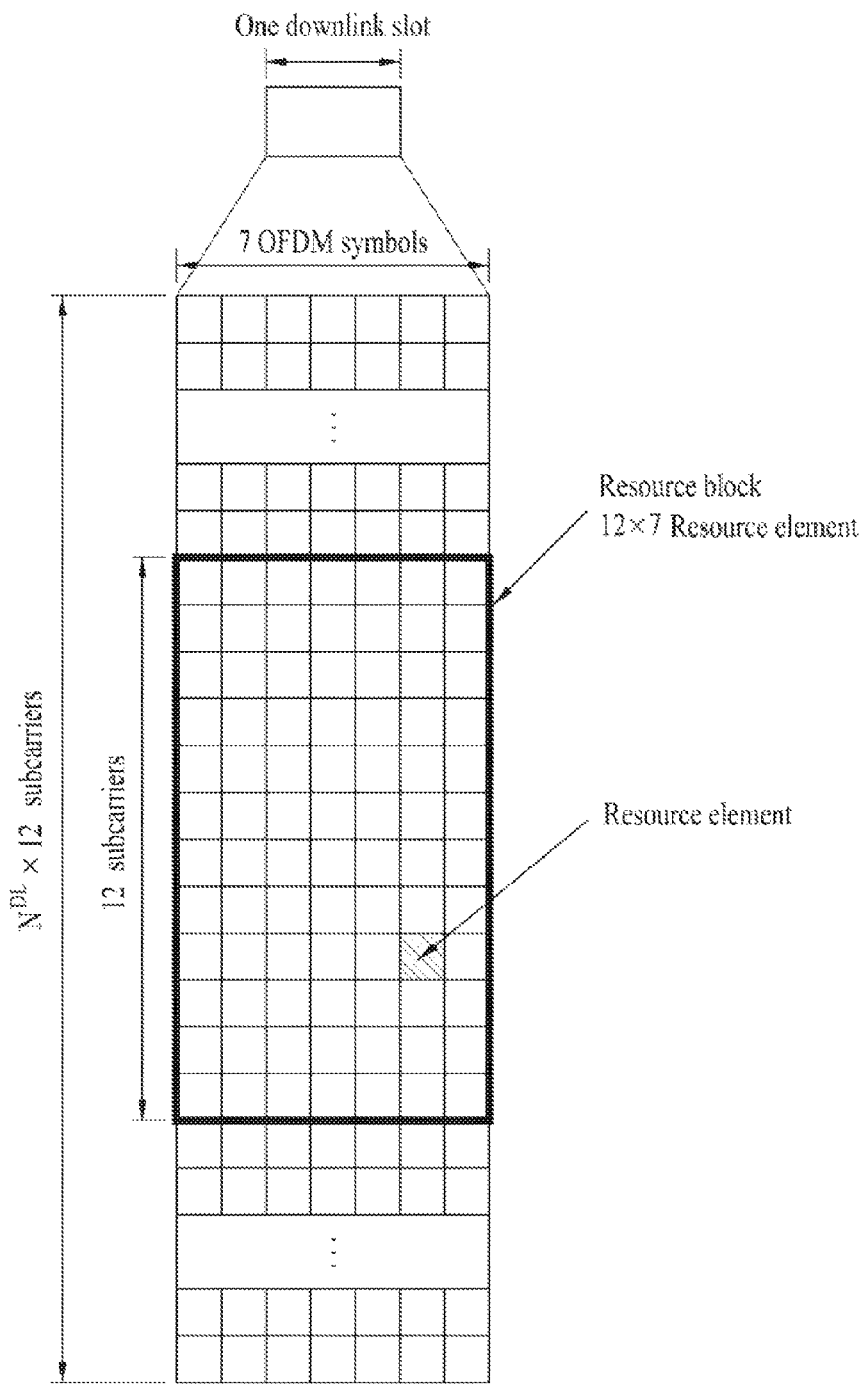
FIG. 3 is a diagram illustrating a resource grid of a downlink slot.

FIG. 3 is a diagram illustrating a resource grid of a downlink slot.

Referring to FIG. 3, the downlink slot includes a plurality of OFDM symbols in a time domain. The downlink slot includes seven (six) OFDM symbols and a plurality of resource blocks. The resource block may include twelve subcarriers in a frequency domain. Each element on the resource grid will be referred to as a resource element (RE), and one resource block (RB) includes 12×7 (6) resource elements (REs). The number of resource blocks (RBs) included in the downlink slot depends on a downlink transmission bandwidth. The structure of an uplink slot is the same as that of the downlink slot, wherein OFDM symbols are replaced with SC-FDMA symbols.

Figure 4:
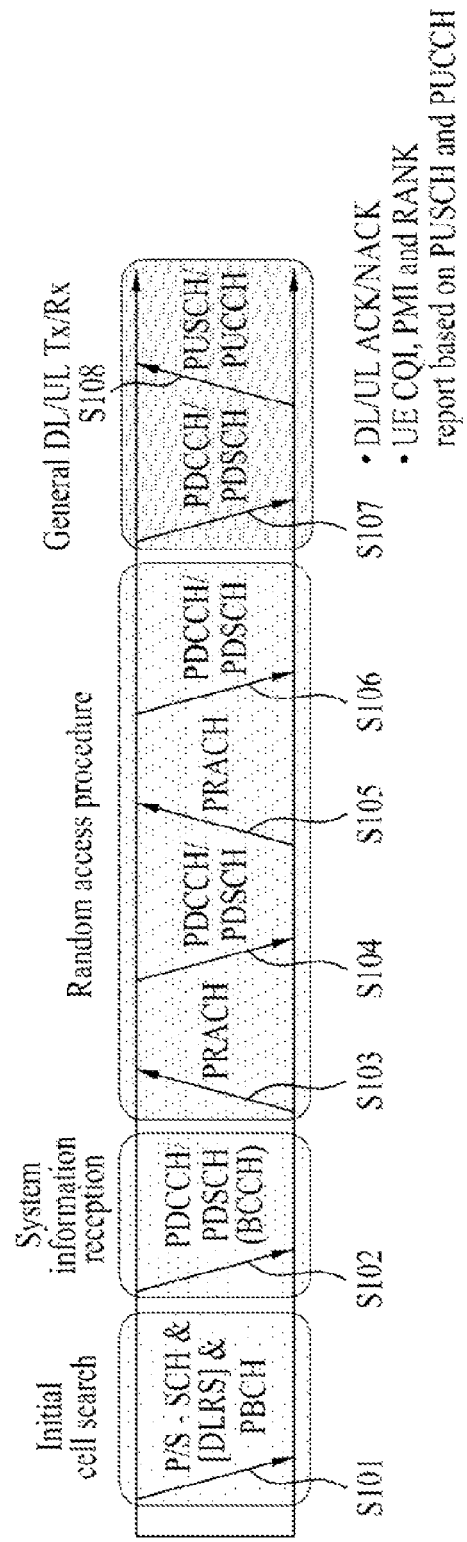
FIG. 4 is a diagram illustrating physical channels used in an LTE(-A) system and a general method for transmitting a signal using the physical channels.

FIG. 4 is a diagram illustrating physical channels used in an LTE(-A) system and a general method for transmitting a signal using the physical channels.

Referring to FIG. 4, the user equipment, of which power is turned on, or which newly enters a cell, performs initial cell search such as synchronizing with the base station at step S101. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink control channel (PDCCH) and a physical downlink shared channel (PDSCH) based on the PDCCH at step S102.

Afterwards, the user equipment may perform a random access procedure (RACH) such as steps S103 to S106 to complete access to the base station. To this end, the user equipment may transmit a preamble through a physical random access channel (PRACH) (S103), and may receive a response message to the preamble through the PDCCH and the PDSCH corresponding to the PDCCH (S104). In case of a contention based RACH, the user equipment may perform a contention resolution procedure such as transmission (S105) of additional physical random access channel (PRACH) and reception (S106) of the physical downlink control channel (PDCCH) and the physical downlink shared channel (PDSCH) corresponding to the physical downlink control channel.

The user equipment which has performed the aforementioned steps may receive the physical downlink control channel (PDCCH)/physical downlink shared channel (PDSCH) (S107) and transmit a physical uplink shared channel (PUSCH) and a physical uplink control channel (PUCCH) (S108), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. The CSI includes a channel quality indicator (CQI), a precoding matrix indicator (PMI), rank indication (RI), etc. Although the UCI is generally transmitted through the PUCCH, it may be transmitted through the PUSCH if PUSCH allocation is made for UCI transmission subframe. Also, the user equipment may non-periodically transmit the UCI through the PUSCH in accordance with request/command of the network.

Figure 5:
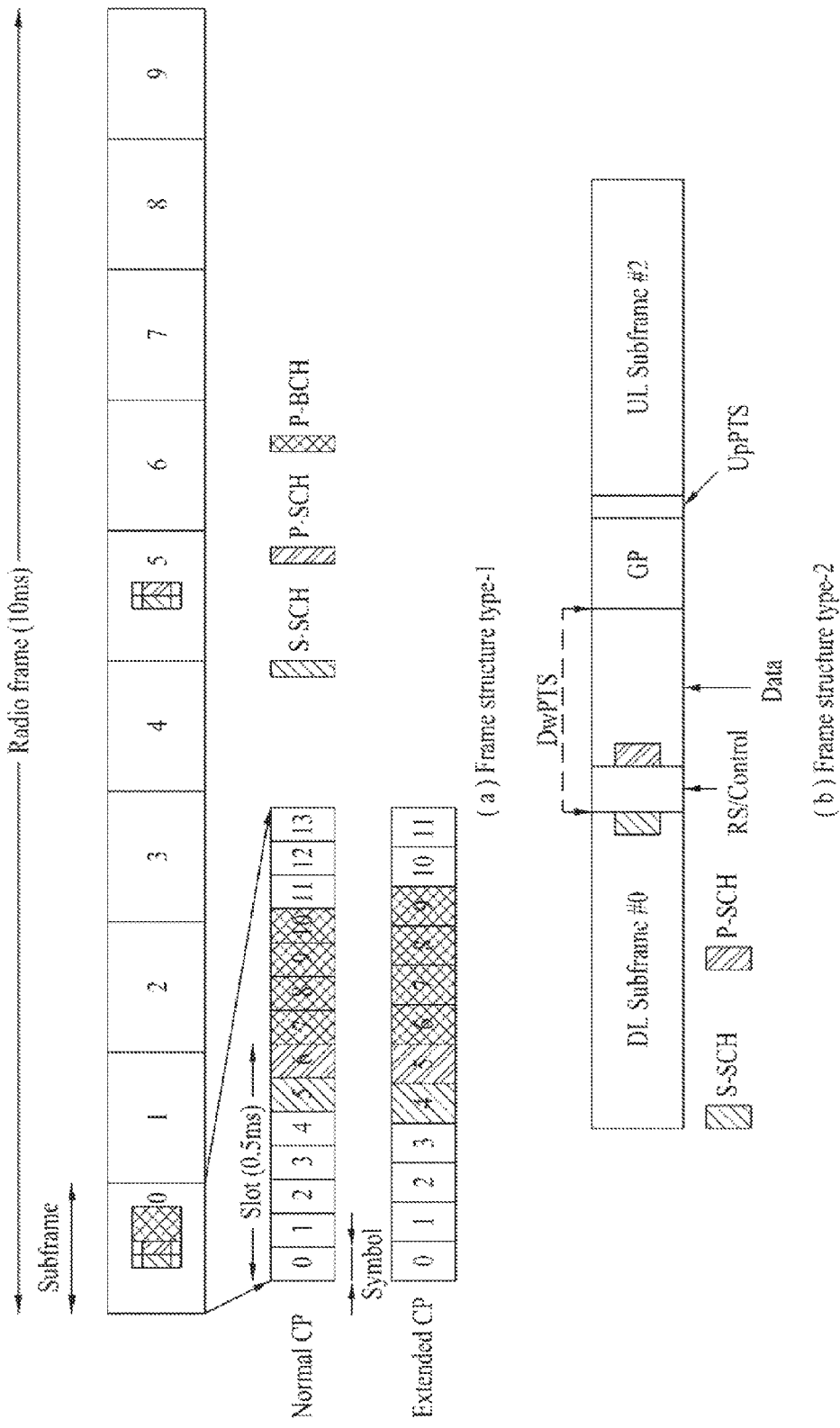
FIG. 5 is a diagram illustrating a structure of a synchronization channel and a broadcast channel in a radio frame.

FIG. 5 is a diagram illustrating a primary broadcast channel (P-BCH) and a synchronization channel (SCH). The SCH includes a primary synchronization channel (P-SCH) and a secondary synchronization channel (S-SCH). The P-SCH carries a primary synchronization signal (PSS), and the S-SCH carries a secondary synchronization signal (SSS).

Referring to FIG. 5, in the frame structure type-1 (that is, FDD), the P-SCH is located at the last OFDM symbol of slot #0 (that is, first slot of subframe #0) and slot #10 (that is, first slot of subframe #5) per radio frame. The S-SCH is located at a previous OFDM symbol of the last OFDM symbol of slot #0 and slot #10 per radio frame. The S-SCH and the P-SCH are located at neighboring OFDM symbols. In the frame structure type-2 (that is, TDD), the P-SCH is transmitted through the third OFDM symbol of subframe #1/#6, and the S-SCH is located at the last OFDM symbol of slot #1 (that is, second slot of subframe #0) and slot #11 (that is, second slot of subframe #5). The P-BCH is transmitted per four radio frames regardless of the frame structure type, and is transmitted using the first to fourth OFDM symbols of the second slot of the subframe #0. The P-SCH is transmitted using 72 subcarriers (10 subcarriers are reserved, and 62 subcarriers are used for PSS transmission) based on DC (direct current) subcarrier within the OFDM symbols. The S-SCH is transmitted using 72 subcarriers (10 subcarriers are reserved, and 62 subcarriers are used for SSS transmission) based on DC subcarrier within the OFDM symbols. The P-BCH is mapped into four OFDM symbols and 72 subcarriers based on one subframe within one subframe.

Figure 6:
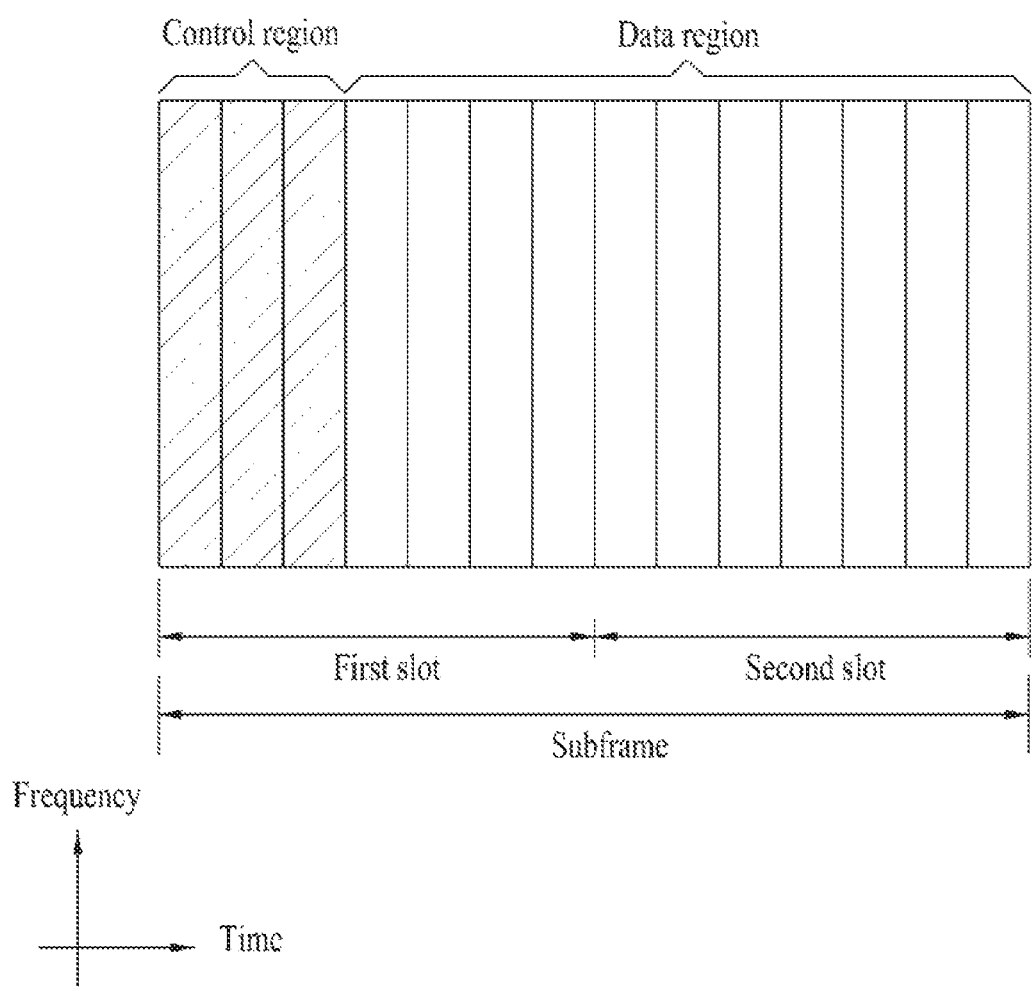
FIG. 6 is a diagram illustrating a structure of a downlink subframe.

FIG. 6 is a diagram illustrating a structure of a downlink subframe.

Referring to FIG. 6, maximum three (four) OFDM symbols located at the front of the first slot within a subframe correspond to a control region to which a control channel is allocated. The other OFDM symbols correspond to a data region to which a physical downlink shared channel (PDSCH) is allocated. Examples of the downlink control channel used in the LTE include a PCFICH (Physical Control Format Indicator CHannel), a PDCCH (Physical Downlink Control CHannel), and a PHICH (Physical Hybrid ARQ Indicator CHannel).

Figure 7:
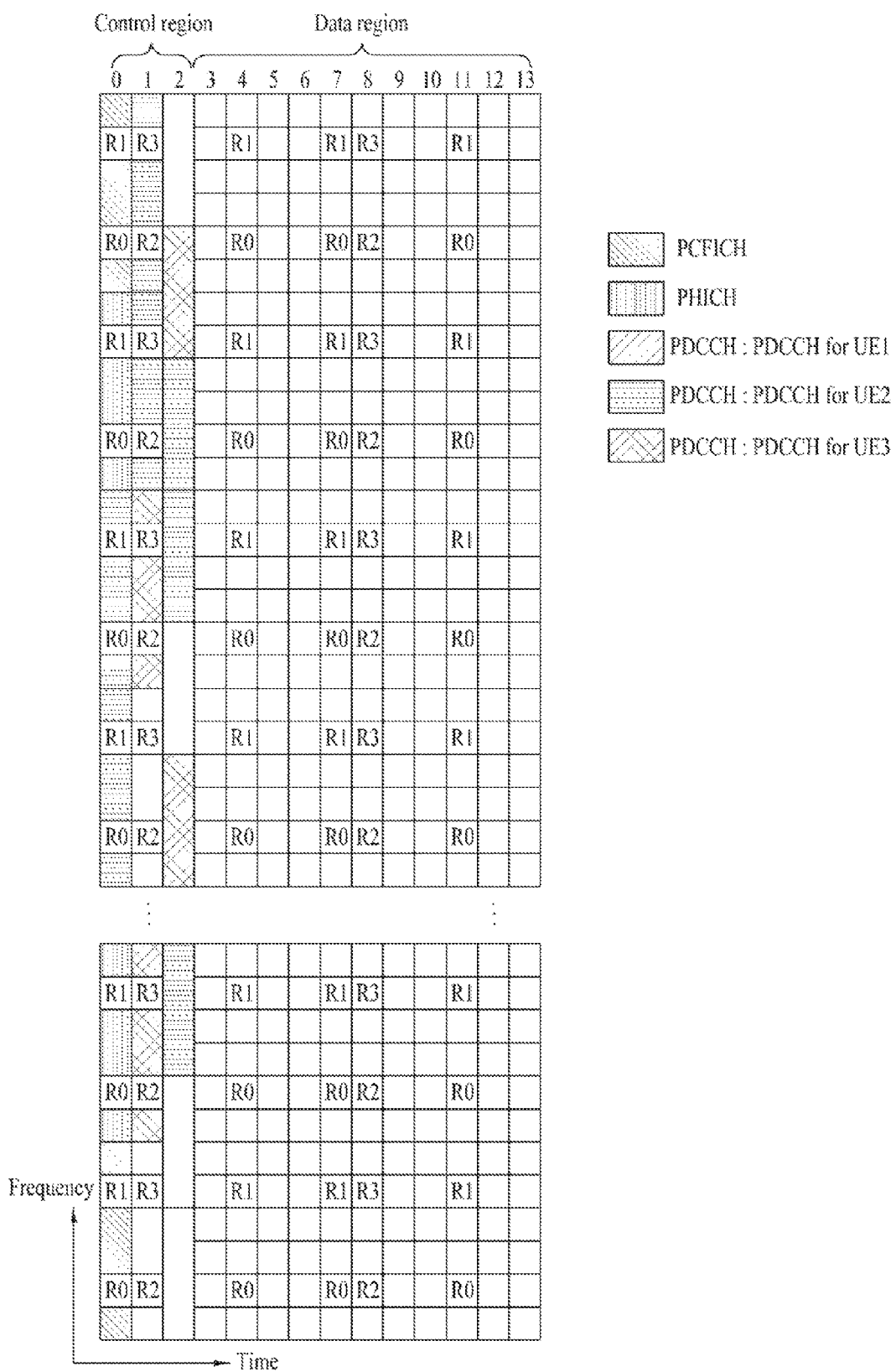
FIG. 7 is a diagram illustrating a control channel allocated to a downlink subframe.

FIG. 7 is a diagram illustrating a control channel allocated to a downlink subframe. In FIG. 7, R1 to R3 represent CRS (cell-specific reference signal or cell-common reference signal) for antenna ports 0 to 3. The CRS is transmitted from a full-band per subframe, and is fixed to a given pattern within the subframe. The CRS is used for channel measurement and downlink signal demodulation.

Referring to FIG. 7, the PCFICH is transmitted from the first OFDM symbol of the subframe, and carries information on the number of OFDM symbols used for transmission of the control channel within the subframe. The PCFICH includes four REGs, each of which is distributed equally within the control region on the basis of cell ID. The PCFICH indicates a value of 1 to 3 (or 2 to 4), and is modulated by QPSK (Quadrature Phase Shift Keying). The PHICH carries HARQ ACK/NACK (acknowledgement/negative-acknowledgement) signal in response to uplink transmission. The PHICH is allocated on the REG remaining except for CRS and PCFICH (first OFDM symbol) from one or more OFDM symbols set by PHICH duration. The PHICH is allocated to three REGs distributed in the maximum range on the frequency domain.

The PDCCH is allocated within first n OFDM symbol (hereinafter, control region) of the subframe. In this case, n is an integer greater than 1 and is indicated by the PCFICH. Control information transmitted through the PDCCH will be referred to as downlink control information (DCI). The DCI format 0, 3, 3A and 4 are defined for an uplink, and DCI formats 1, 1A, 1B, 1C, 1D, 2, 2A, 2B and 2C are defined for a downlink. The DCI format selectively includes information such as a hopping flag, RB allocation, a modulation coding scheme (MCS), redundancy version (RV), new data indicator (NDI), transmit power control (TPC), a cyclic shift demodulation reference signal (DM RS), request of channel quality information (CQI), a HARQ process number, a transmitted precoding matrix indicator (TPMI), and precoding matrix indicator (PMI) confirmation, in accordance with usage.

The PDCCH carries transport format and resource allocation information of a downlink shared channel (DL-SCH), transport format and resource allocation information of an uplink shared channel (UL-SCH), paging information on a paging channel (PCH), system information on the DL-SCH, resource allocation information of an upper layer control message such as a random access response transmitted on the PDSCH, a transmission power control command set of individual user equipments (UEs) within a user equipment group, Tx power control command, and activation indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide a PDCCH with a predetermined coding rate based on the status of a radio channel. The CCE corresponds to a plurality of resource element groups (REGs). The format of the PDCCH and the number of available bits of the PDCCH are determined depending on the number of CCEs. The base station determines a PDCCH format depending on the DCI to be transmitted to the user equipment, and attaches cyclic redundancy check (CRC) to the control information. The CRC is masked with an identifier (for example, radio network temporary identifier (RNTI)) depending on owner or usage of the PDCCH. For example, if the PDCCH is for a specific user equipment, the CRC may be masked with an identifier (for example, cell-RNTI (C-RNTI)) of the corresponding user equipment. If the PDCCH is for a paging message, the CRC may be masked with a paging identifier (for example, Paging-RNTI (P-RNTI)). If the PDCCH is for system information (in more detail, system information block (SIB)), the CRC may be masked with system information RNTI (SI-RNTI). If the PDCCH is for random access response, the CRC may be masked with a random access RNTI (RA-RNTI).

A plurality of PDCCHs may be transmitted within one subframe. Each PDCCH is transmitted using one or more control channel elements (CCEs), each of which corresponds to nine sets of four resource elements. Four resource elements will be referred to as a resource element group (REG). Four QPSK symbols are mapped into one REG. A resource element (RE) allocated to the reference signal (RS) is not included in the REG. Accordingly, a total number of REGs within given OFDM symbols are varied depending on the presence of a cell-specific reference signal.

TABLE 1

| PUCCH format | Number of CCEs (n) | Number of REGs | Number of PUCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCEs are used by being numbered continuously. In order to simplify a decoding process, the PDCCH having a format that includes n number of CCEs may start from only CCE having a number equivalent to a multiple of n. The number of CCEs used for transmission of a specific PDCCH is determined by the base station in accordance with a channel condition. For example, if the PDCCH is for a user equipment having a good downlink channel (for example, adjacent to base station), one CCE may be required. However, in case of a user equipment having a poor channel (for example, adjacent to the cell edge), eight CCEs may be used to obtain sufficient robustness. Also, a power level of the PDCCH may be adjusted to correspond to the channel condition.

The LTE(-A) system defines location of a limited set of CCEs, where the PDCCH may be located for each user equipment. The location of the limited set of CCEs, where the user equipment may discover its PDCCH, may be referred to as a search space (SS). In the LTE(-A) system, the search space has different sizes depending on each PDCCH format. Also, user equipment specific (UE-specific) and common search spaces are defined separately. The UE-specific search space (USS) is configured separately for each user equipment, and the range of the common search space (CSS) is notified to all the user equipments. The USS and the CSS may be overlapped with each other. In case of a search space which is significantly small, since there is no remaining CCE if some CCE location is allocated in a search space for a specific user equipment, the base station may not discover CCE resources for transmitting PDCCH to all the possible user equipments, within a given subframe. In order to minimize possibility of such blocking that may occur in next subframe, a start location of the USS is subjected to hopping UE-specifically.

Table 2 illustrates sizes of the CSS and the USS.

TABLE 2

| PUCCH format | The number of CCEs (n) | The number of candidates within a common search space | The number of candidates within UE-specific search space |
|---|---|---|---|
| 0 | 1 | — | 6 |
| 1 | 2 | — | 6 |
| 2 | 4 | 4 | 2 |
| 3 | 8 | 2 | 2 |

In order to control calculation load based on a total number of times of blind decoding (BD), the user equipment is not required to search for all the DCI formats, which are defined, at the same time. Generally, the user equipment always searches for formats 0 and 1A within the USS. The formats 0 and 1A have the same sizes as each other, and are identified from each other by a flag within a message. Also, the user equipment may be required to receive additional format (for example, format 1, 1B, or 2 in accordance with a PDSCH transmission mode configured by the base station). The user equipment searches for the formats 1A and 1C in the common search space (CSS). Also, the user equipment may be configured to search for the format 3 or 3A. The formats 3 and 3A may have the same sizes as each other, and may be identified from each other by scrambling CRC with (common) identifiers different from each other instead of UE-specific identifier.

Figure 8:
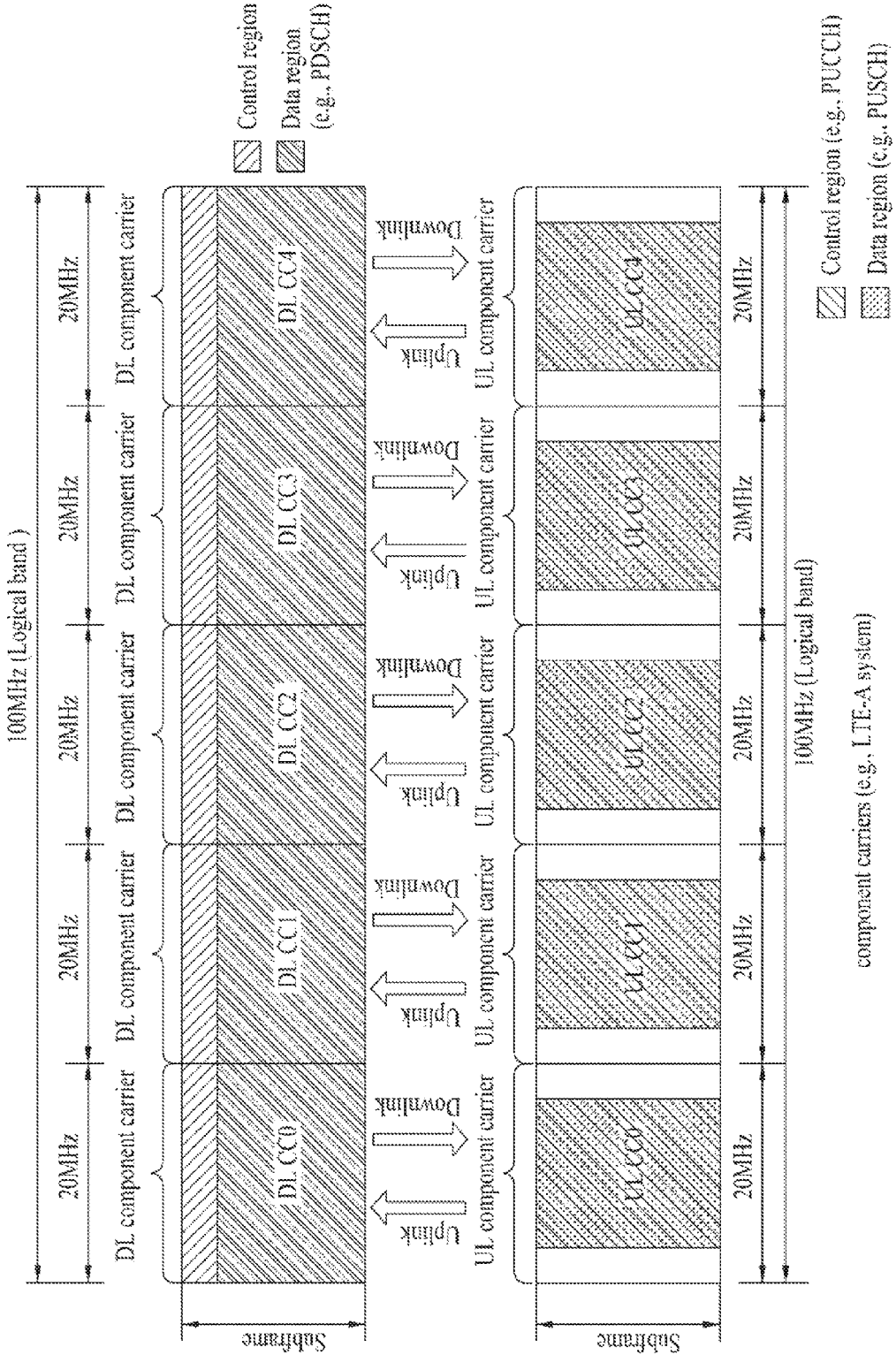
FIG. 8 is a diagram illustrating a carrier aggregation (CA) communication system.

FIG. 8 is a diagram illustrating a carrier aggregation (CA) communication system.

Referring to FIG. 8, a plurality of uplink/downlink component carriers (CC) may be collected to support wider uplink/downlink bandwidths. The respective CCs may adjoin each other or not in the frequency domain. A bandwidth of each component carrier may be defined independently. Asymmetric carrier aggregation where the number of UL CCs is different from the number of DL CCs may be performed. Meanwhile, the control information may be set to be transmitted and received through a specific CC only. This specific CC may be referred to as a primary CC (PCC), and the other CCs may be referred to as secondary CCs, For example, if cross-carrier scheduling (or cross-CC scheduling) is used, the PDCCH for downlink allocation is transmitted to DL CC#0, and the corresponding PDSCH may be transmitted to DL CC#2. The terminology "component carrier" may be replaced with an equivalent another terminology (for example, carrier, cell, etc.).

For cross-carrier scheduling, a carrier indicator field (CIF) is used. Configuration of the presence or not of the CIF within the PDCCH may be enabled by upper layer signaling (for example, RRC signaling) semi-statically and user equipment-specifically (or user equipment group-specifically). The base line of PDCCH transmission may be summed up as follows.

CIF disabled: the PDCCH on the DL CC allocates PDSCH resource on the same DL CC or PUSCH resource on one linked UL CC.
  No CIF
CIF enabled: the PDCCH on the DL CC may allocate PDSCH or PUSCH resource on one DL/UL CC of a plurality of aggregated DL/UL CCs by using the CIF.
  LTE DCI format extended to have CIF
  CIF (if configured) is a fixed x-bit field (for example, x=3)
  CIF (if configured) location is fixed regardless of DCI format size.

If the CIF exists, the base station may allocate a PDCCH monitoring DL CC (set) to reduce complexity of BD in view of the user equipment. For PDSCH/PUSCH scheduling, the user equipment may detect and decode the PDCCH on the corresponding DL CC only. Also, the base station may transmit the PDCCH through monitoring DL CC (set) only. The monitoring DL CC set may be set user equipment-specifically, user equipment group-specifically or cell-specifically.

Figure 9:
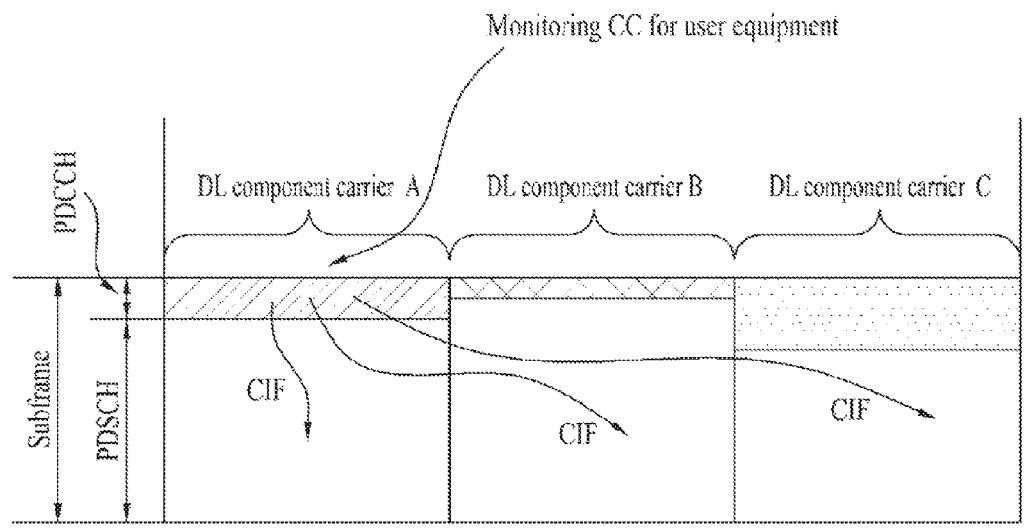
FIG. 9 is a diagram illustrating cross-carrier scheduling.

FIG. 9 illustrates that three DL CCs are aggregated and DL CC A is set to a monitoring DL CC. If the CIF is disabled, each DL CC may transmit the PDCCH that schedules a PDSCH of each DL CC without CIF in accordance with the LTE PDCCH rule. On the other hand, if the CIF is enabled by upper layer signaling, only the DL CC A may transmit the PDCCH, which schedules the PDSCH of another CC as well as the PDSCH of the DL CC A, by using the CIF. The PDCCH is not transmitted from the DL CC B and DL CC C which are not set to the PDCCH monitoring DL CC. In this case, monitoring DL CC may be replaced with equivalent terminologies such as monitoring carrier, monitoring cell, scheduling carrier, scheduling cell, serving carrier, and serving cell. The DL CC to which PDSCH corresponding to PDCCH is transmitted and the UL CC to which PUSCH corresponding to PDCCH is transmitted may be referred to as scheduled carrier, scheduled cell, etc.

As described with reference to FIGS. 6 and 7, in the LTE(-A) system, FDD DL carrier. TDD DL subframes use first n number of OFDM symbols of the subframe for transmission of PDCCH, PHICH, and PCFICH, which are physical channels for transmission of various kinds of control information, and use the other OFDM symbols for PDSCH transmission. The number of symbols used for control channel transmission for each subframe is forwarded to the user equipment dynamically through the physical channel such as PCFICH, or semi-statically through RRC signaling. The value of n may be set to one symbol to maximum four symbols in accordance with subframe features and system features (FDD/TDD, system bandwidth, etc.). Meanwhile, in the LTE system according to the related art, the PDCCH which is a physical channel for DL/UL scheduling and transmitting various kinds of control information has limitation in that the PDCCH is transmitted through limited OFDM symbols. Accordingly, introduction of an enhanced PDCCH (E-PDCCH) multiplexed with the PDSCH more freely in accordance with FDM mode may be considered in the LTE-A system.

Figure 10:
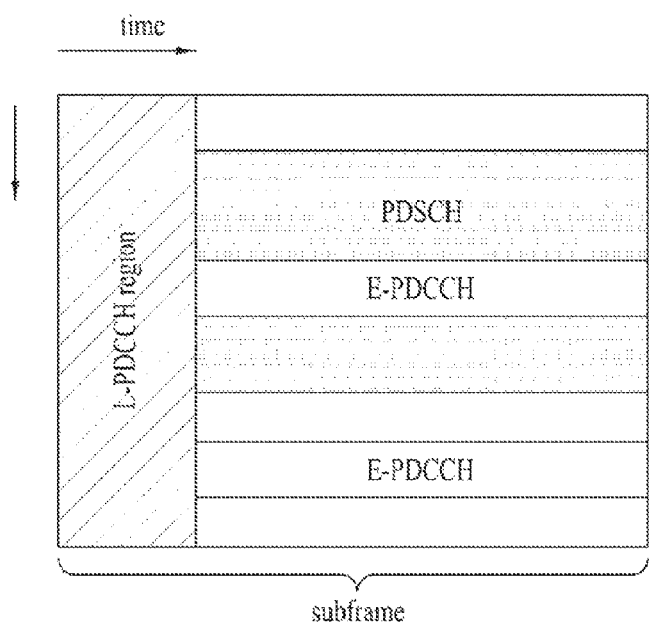
FIG. 10 is a diagram illustrating an example of allocating a PDCCH to a data region of a subframe.

FIG. 10 is a diagram illustrating an example of allocating a downlink physical channel to a subframe.

Referring to FIG. 10, a PDCCH (for convenience, legacy PDCCH (L-PDCCH)) according to the LTE(-A) system of the related art may be allocated to the control region (see FIGS. 6 and 7) of the subframe. In FIG. 10, an L-PDCCH region means a region to which the legacy PDCCH may be allocated. In accordance with the context, the L-PDCCH region may mean the control region, a control channel resource region (that is, CCE resource) to which the PDCCH may actually be allocated within the control region, or a PDCCH search space. Meanwhile, the PDCCH may additionally be allocated to the data region (for example, resource region for PDSCH, see FIGS. 6 and 7). The PDCCH allocated to the data region will be referred to as E-PDCCH. As shown, a control channel resource is additionally acquired through the E-PDCCH, whereby scheduling restriction due to a limited control channel resource of the L-PDCCH region may be mitigated.

In the same manner as the L-PDCCH, the E-PDCCH carries the DCI. For example, the E-PDCCH may carry downlink scheduling information and uplink scheduling information. The procedure of the E-PDCCH/PDSCH and the procedure of the E-PDCCH/PUSCH are the same as/similar to the description made with reference to the steps S107 and S108 of FIG. 4. In other words, the user equipment may receive the E-PDCCH, and may receive data/control information through the PDSCH corresponding to the E-PDCCH. Also, the user equipment may receive the E-PDCCH, and may transmit data/control information through the PUSCH corresponding to the E-PDCCH. Meanwhile, the existing LTE previously reserves a PDCCH candidate region (hereinafter, PDCCH search space) within the control region and transmits a PDCCH of a specific user equipment to some region of the reserved PDCCH candidate region. Accordingly, the user equipment may obtain its PDCCH within the PDCCH search space through blind decoding. Similarly, the E-PDCCH may be transmitted to some or all of the resources which are previously reserved.

Figure 11:
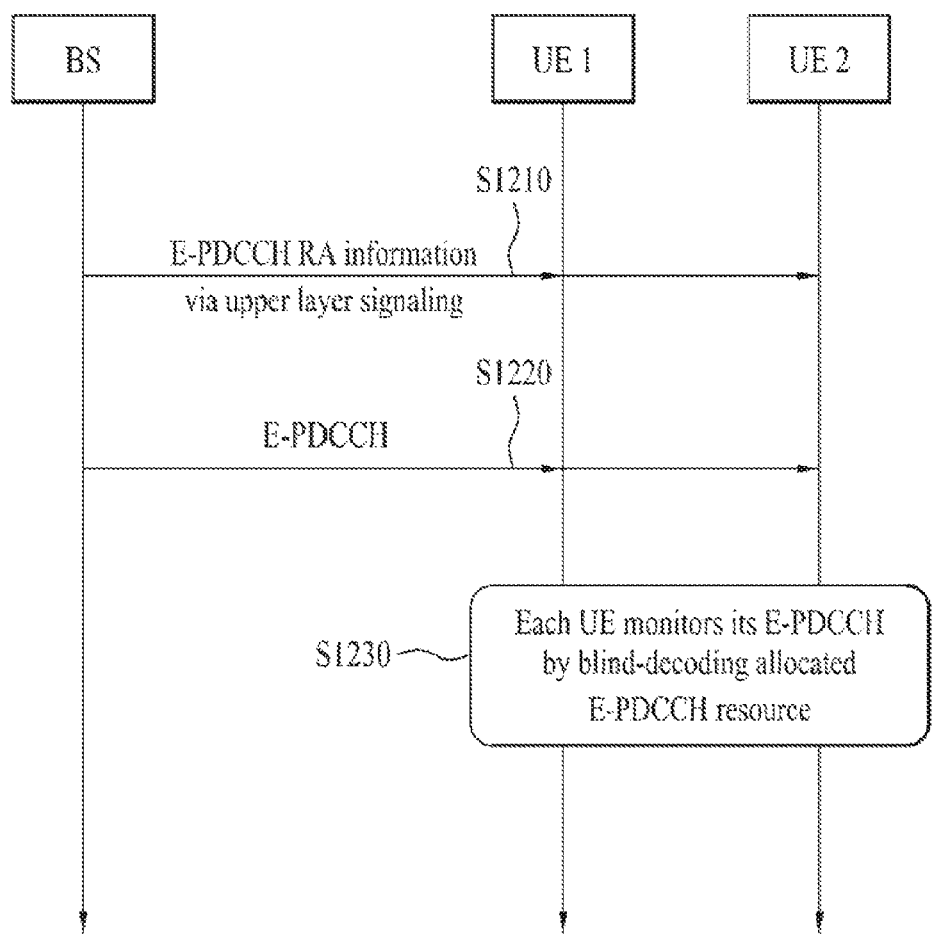
FIG. 11 is a diagram illustrating resource allocation for E-PDCCH and a procedure of receiving PDSCH.

FIG. 11 is a diagram illustrating resource allocation for E-PDCCH and a procedure of receiving PDSCH.

Referring to FIG. 11, the base station transmits E-PDCCH resource allocation (RA) information to the user equipment (S1210). The E-PDCCH RA information may include RB (or VRB (Virtual Resource Block)) allocation information. The RB allocation information may be given in a unit of RB or RBG (Resource Block Group). The RBG includes two or more continuous RBs. The E-PDCCH RA information may be transmitted using upper layer (for example, Radio Resource Control layer (RRC layer)) signaling. In this case, the E-PDCCH RA information is used to previously reserve the E-PDCCH resource (region). Afterwards, the base station transmits the E-PDCCH to the user equipment (S1220). The E-PDCCH may be transmitted within some or all regions of the reserved E-PDCCH resource (for example, M number of RBs) at step S1210. Accordingly, the user equipment monitors a resource (region) (hereinafter, referred to as E-PDCCH search space) to which the E-PDCCH may be transmitted (S1230). The E-PDCCH search space may be given as a part of the RB set allocated at step S1210. In this case, monitoring includes blind decoding of a plurality of E-PDCCH candidates within the search space.

Hereinafter, although the embodiments 1 to 4 will be described independently for convenience, the embodiments may be used in combination.

Embodiment: Communication Considering a Plurality of Carrier Types

If a wireless communication network supports a plurality of carrier types, a subframe structure may be defined for efficient operation in accordance with a carrier type. In the present invention, it is assumed that two carrier types are provided. The first carrier type includes a carrier type (hereinafter, legacy carrier type (LCT)) of the 3GPP LTE system of the related art. In view of reference signal transmission, the LCT may be characterized in that a reference signal (for example, cell-specific reference signal or cell-common reference signal (CRS)) is transmitted to a full-band of some OFDM symbols at least the front of all the subframes. The second carrier type includes a new carrier type (hereinafter, new carrier type (NCT)) that may be introduced in an evolved system of the LTE. In view of reference signal transmission, the NCT may be characterized in that the reference signal (for example, CRS) is transmitted at some subframe and/or some frequency resource only. In comparison with the LCT, although the reference signal transmitted in the NCT is described as the CRS, the CRS actually transmitted in the NCT may be RS having the same configuration as that of the CRS of the LCT, RS having a similar configuration to that of the CRS of the LCT, or RS newly defined for the NCT. Also, in the NCT, the CRS may be used for time/frequency synchronization. In this case, the CRS transmitted in the NCT may be referred to as tracking RS.

Figure 12:
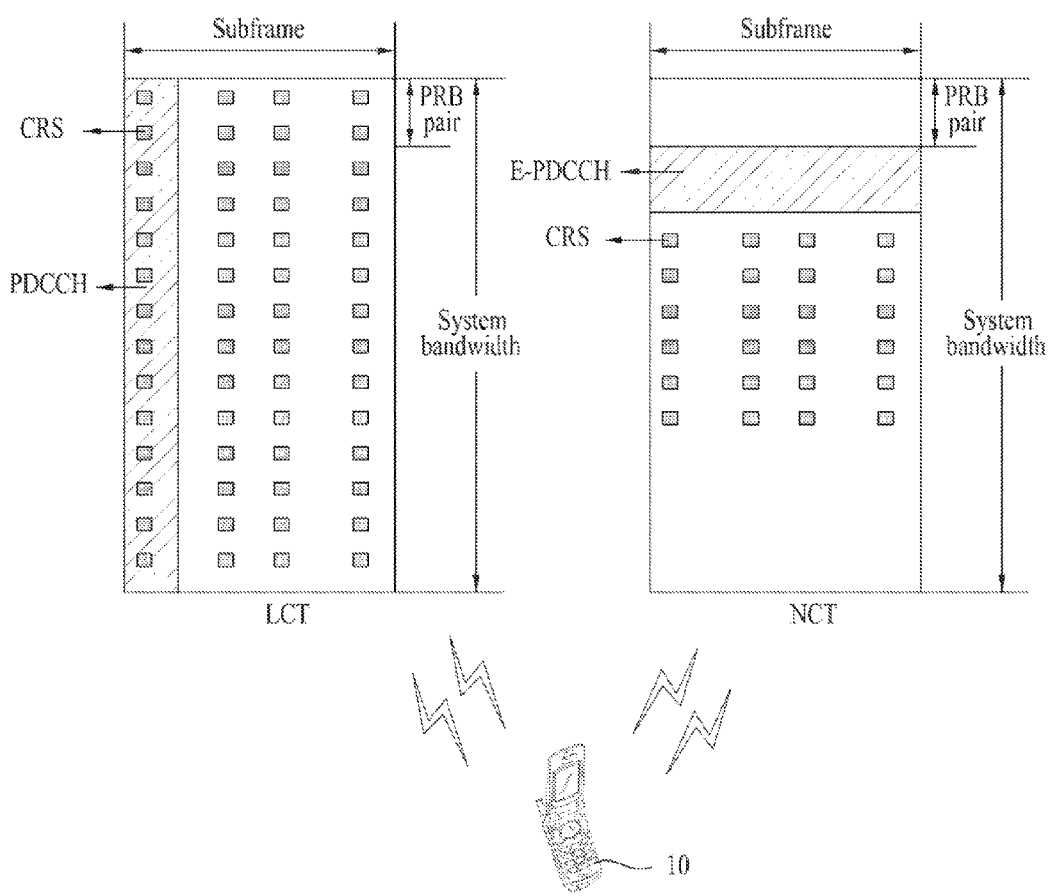
FIG. 12 is a diagram illustrating subframe configuration based on types of carriers.

FIG. 12 is a diagram illustrating subframe configuration of LCT and NCT. For convenience, it is assumed that the LCT uses the existing PDCCH, and the NCT uses the E-PDCCH based on UE-specific RS (for example, DeModulation Reference Signal (DMRS)). In the NCT, the E-PDCCH may be located from the first OFDM symbol of the subframe unlike the example of FIG. 10. At least a part of a frequency band of the LCT may be overlapped with at least a part of a frequency band of the NCT (case 1), or the frequency band of the LCT may not be overlapped with that of the NCT (case 2). The case 1 may be the case where the LCT and the NCT are managed by different base stations, and the case 2 may be the case where the LCT and the NCT are managed by different base stations or the same base station.

Hereinafter, a subframe structure that the NCT and the LCT may desirably coexist in a single frequency band and resource utility in the NCT may be increased, and a signaling method between cells or between a cell and a user equipment based on the subframe structure will be suggested. In this case, the subframe structure means that available time/frequency resources (for example, RE) within the subframe are configured for signal transmission (for example, physical channel). Since the other time/frequency resources (for example, RE) except for the time/frequency resources (for example, RE) for the reference signal at the subframe are used, but not limited to, for transmission of each physical channel, the subframe structure may be determined by CP length (for example, normal CP, extended CP) and depending on what reference signal is transmitted from what RE.

Embodiment 1: Reference Signal Transmission (for Example, CRS Transmission)

In the NCT, it is preferable that a resource (for example, RE) corresponding to the CRS is used for transmission of another physical channel without transmitting the CRS if possible, to minimize overhead caused by CRS transmission. However, for basis operation (for example, time/frequency synchronization operation in cell) of the user equipment, it may be effective to use the CRS. For this operation, the CRS may be transmitted from a limited resource only. Accordingly, in the NCT, although the CRS is transmitted, the time/frequency resource to which the CRS is transmitted may be limited to a partial selective resource. For example, in case of the NCT, some subframes are selected, and the CRS may be transmitted from some or all RBs of the selected subframes.

In the NCT, if the CRS is transmitted from some resource only of the time/frequency domain, it is preferable that information (hereinafter. CRS transmission information) for identifying a CRS transmission resource is notified to a base station and a user equipment of another cell (for example, neighboring cell). In this case, a serving cell (or base station) may receive CRS transmission information on the NCT from the neighboring cell (or base station), and may notify its user equipment of a resource from which the CRS is transmitted in the corresponding NCT, on the basis of the received CRS transmission information. As a result, the user equipment may first detect the CRS of the neighboring NCT cell, remove interference component caused by the CRS from the received signal and again detect its physical channel. In more detail, the CRS transmission information may include at least one of information on subframe set (or subframe pattern) and information on RB set (or RB pattern) to which the CRS is transmitted. If the NCT cell and the neighboring cell are configured at different base stations, the CRS transmission information may be transmitted through an inter-cell communication link (for example, interface X2, etc.). The subframe set (or subframe pattern) may be indicated using a bitmap or by period/offset. If the bitmap corresponding to the subframe set (or subframe pattern) is configured, the specific subframe (for example, PSS/SSS transmission subframe) may be excluded from the procedure of configuring the bitmap.

Additionally, the NCT cell may notify the neighboring cell that the CRS is not transmitted from the other resource except for the CRS resource by notifying the neighboring cell that it is operated in accordance with the NCT. If RB set and/or subframe set to which the CRS is transmitted is fixed constantly in all the NCT cells (for example, some RB in the middle of system bandwidth is fixed or transmission is performed at previously designated subframe only such as subframe #0 and #5), the NCT cell can notify the neighboring cell (or base station)/user equipment of at which subframe/RB the CRS is transmitted by merely notifying the neighboring cell of the fact that it is the NCT cell. If any one of the subframe set and RB set on which the CRS is transmitted is fixed in the NCT cell, the NCT cell may notify the neighboring cell (or base station)/user equipment of any one of the subframe set and the RB set together with the fact that it is the NCT cell. Based on this information, the user equipment of the neighboring cell may simply detect/measure the NCT cell during inter-cell interference mitigation operation or neighboring cell detection/measurement operation. In other words, when detecting/measuring the (neighboring) NCT cell, the user equipment may try detection/measurement at only the resource on which the CRS is transmitted, on the basis of the information forwarded from the corresponding NCT cell.

The CRS transmission information of the neighboring NCT cell may (additionally) include at least one of information on a center frequency location of the neighboring cell and information on a full bandwidth. This information is helpful to identify the CRS information (for example, CRS location) of the corresponding NCT cell when the NCT cell is operated at a center frequency and/or bandwidth, which is different from that of another cell. In particular, since the NCT cell is likely to be operated as a secondary cell in the carrier aggregation system, it is likely that the NCT cell reserves a part only of the full bandwidth. In other words, the full bandwidth includes a plurality of frequency regions, and some of the plurality of frequency regions may be set to the NCT cell. Accordingly, the center frequency location and the full bandwidth information may be notified to the neighboring cell to assist identification of the CRS location on the NCT cell. Also, the center frequency and bandwidth of the neighboring NCT cell may be forwarded to the user equipment through the upper layer signal. Similarly signaling of the center frequency and the bandwidth may be also possible for a normal cell not the NCT cell. Likewise, signaling of the center frequency and the bandwidth may assist identification of CRS information (for example, frequency domain to which the CRS is transmitted) of the neighboring cell. If there is no information, the user equipment may assume that the center frequency and/or bandwidth of the neighboring cell (particularly, cell indicated as a cell that causes interference) is the same as that of the serving cell. In particular, the aforementioned operation assists avoidance of interference from the CRS of the neighboring cell.

Also, the cell that has received the CRS transmission information may notify its user equipment of CRS information on the neighboring NCT cell through upper layer signal such as RRC (Radio Resource Control). In more detail, the base station may notify the user equipment whether a specific neighboring cell is the NCT cell and notify the user equipment of CRS transmission subframe and information on CRS transmission RB set if the neighboring cell is the NCT cell.

In the meantime, the user equipment may generally detect the PDSCH on the basis of user equipment-specific RS in the NCT, and the CRS may be transmitted on some RB of some subframe as described above. This CRS overhead should be considered appropriately when the user equipment calculates CSI on the NCT cell and feeds the CSI back. Generally, if RS overhead is varied depending on subframe or RB, CSI calculation complexity of the user equipment is increased, and the base station may have a difficulty in identifying whether reported change of the CS1 is caused by change of actual channel status or change of RS overhead. In order to solve this, the present invention suggests that the user equipment calculates CSI on the NCT on the assumption that the CRS is not transmitted on all the RBs of all the subframes. Alternatively, the user equipment may calculate CSI on the assumption that a region in which the CRS is transmitted is the most unfavorable condition in view of the available resource amount and the CRS is transmitted on the full-band at least at the subframe for which the CRS is transmitted for the purpose of assuring a normal operation. For example, the user equipment may calculate the CSI on the assumption that the CRS is not transmitted for the subframe at which the CRS is not transmitted, and may calculate the CSI on the assumption that the CRS is transmitted on the full-band even though the CRS is transmitted on at least a partial-band for the subframe at which the CRS is transmitted. For another example, the user equipment may calculate the CSI on the assumption that the CRS is transmitted on all the RBs of all the subframes regardless of the fact whether the CRS is actually transmitted.

Embodiment 2: Transmission of MBSFN Signal

MBSFN (Multicast Broadcast Single Frequency Network) transmission is a transmission scheme that a plurality of cells multicast or broadcast the same signal by joining transmission at the same time. The NCT cell should join MBSFN transmission at a specific subframe together with a neighboring LCT cell.

Since the PDCCH should be transmitted from some OFDM symbols of the front in the LCT, MBSFN signal cannot be transmitted from the first OFDM symbol. In case of the LTE, a resource to which the PDCCH is transmitted and a resource to which the MBSFN signal is transmitted are identified from each other by TDM, and unicast signal transmission for the user equipment does not exist at the OFDM symbol to which the MBSFN signal is transmitted. Accordingly, the user equipment in which MBSFN is not set reads some OFDM symbol at the front of the MBSFN subframe, and does not receive the signal at the later symbol or disregards the received signal during decoding. Meanwhile, since there is no existing restriction for the MBSFN subframe in the NCT, the MBSFN signal may be transmitted from the first symbol of the MBSFN subframe. However, this case may occur only if all the cells that join MBSFN transmission manage the NCT. If some of the cells that join MBSFN transmission manage the LCT and another some of the cells manage the NCT, a start point of the MBSFN signal within the subframe should be aligned on the basis of the LCT. To this end, the present invention suggests that information (hereinafter, referred to as MBSFN start point identification information) for identifying a start point when the MBSFN signal starts to be transmitted should be shared between cells that join MBSFN transmission. Also, the present invention suggests that a start point of the MBSFN signal determined on the basis of the MBSFN start point identification information should be forwarded to the user equipment through an upper layer signal such as RRC. The MBSFN start point identification information may include OFDM symbol index indicating the start point of the MBSFN signal within the subframe or information (for example, PCFICH information of LCT) on the number of OFDM symbols used for PDCCH transmission.

In the meantime, if the MBSFN signal is transmitted from the NCT cell and the amount of a resource reserved by the MBSFN signal is not great, the MBSFN signal may be restricted to be transmitted from some RB only. To this end, the base station may additionally notify the user equipment of information on RB(s) to which the MBSFN signal is transmitted. If the MBSFN signal is transmitted from the NCT of the MBSFN subframe through some RB only, it is preferable that the other RB is used for unicast signal transmission of the NCT cell. For example, the NCT cell may transmit a control channel and PDSCH based on the user equipment-specific RS by using RB(s) other than RB(s) reserved by the MBSFN signal at the subframe at which MBSFN transmission occurs. According to the suggestion of the present invention, since UL grant may be transmitted for the subframe at which MBSFN transmission occurs, a resource of UL subframe associated with MBSFN subframe may not be wasted. Accordingly, according to this example, the operation of the user equipment at the MBSFN subframe may be varied depending on a carrier type. In more detail, if the MBSFN signal is received in the LCT, the user equipment may perform a signal reception operation on the assumption that there is no other signal (for example, unicast signal (for example, control channel signal)) within the OFDM symbol to which the MBSFN signal is transmitted. On the other hand, if the MBSFN signal is received in the NCT, the user equipment may perform the signal reception operation on the assumption that another signal (for example, unicast signal (for example, control channel signal)) within the OFDM symbol to which the MBSFN signal is transmitted may exist by being multiplexed by FDM. For example, the user equipment may perform a blind decoding procedure for receiving a control channel from RB(s) other than RB(s) where the MBSFN signal exists, and may perform an operation based on the blind decoding procedure.

However, since a set of RBs available at the subframe at which the MBSFN signal is transmitted may be restricted, the NCT cell may manage a region (particularly, region for transmitting a control signal) for transmitting its signal, differently depending on transmission of the MBSFN signal. For example, the NCT cell may signal RB set (for example, E-PDCCH search space), which will be used for transmission of control channel (for example, E-PDCCH), to the user equipment at a normal subframe (that is, non-MBSFN subframe), wherein RB (pair) to which the MBSFN signal is transmitted may be overlapped with RB (pair) for transmission of the control channel in view of RB or RB pair. In order to solve this problem, the NCT cell may notify the user equipment that the control channel is transmitted using RB set, which is additionally signaled, at the subframe at which the MBSFN signal is transmitted, by additionally signaling separate RB set (for example, E-PDCCH search space for MBSFN subframe) to the user equipment. Alternatively, the user equipment that has identified RB(s) to which the MBSFN signal is transmitted may try detection of the control channel on the assumption that a valid control channel may be transmitted to the region only except for the corresponding RB(s). Accordingly, the user equipment may omit the procedure of detecting the control channel for the RB(s) overlapped with the RB(s) to which the MBSFN signal is transmitted, among the RB set for the control channel, or may exclude the procedure of detecting the control channel from the detection procedure. Also, if one control channel candidate includes a plurality of RBs, the detection procedure may be omitted for the control channel candidate where RB(s) to which the MBSFN signal is transmitted is overlapped with one RB, or the corresponding control channel candidate may be excluded from the detection procedure.

Figure 13:
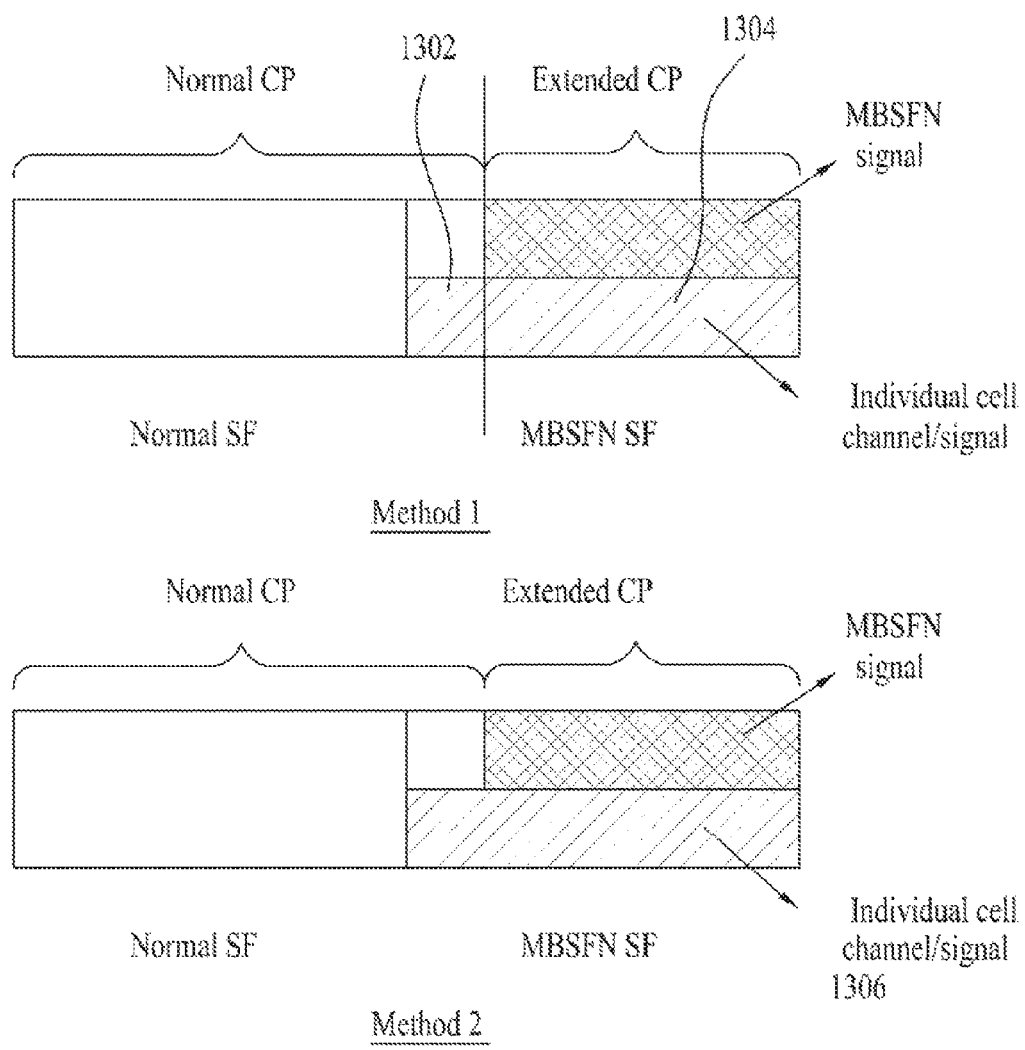
FIG. 13 is a diagram illustrating MBSFN subframe configuration according to one embodiment of the present invention.

Meanwhile, since a plurality of cells join transmission of the MBSFN signal, it is general that a multi-path number of the same signal is great. To this end, the extended CP is used. Meanwhile, as described above, if the MBSFN signal is multiplexed with a channel or signal (hereinafter, referred to as individual cell channel/signal) of the NCT cell at the MBSFN subframe of the NCT cell, the extended CP should be used equally for the individual cell channel/signal. In other words, the individual cell channel/signal multiplexed with the MBSFN signal at the frequency may use the extended CP regardless of CP length used in the normal subframe. At this time, in the NCT, the MBSFN signal may not use some OFDM symbols (for example, first two symbols) of the front of the MBSFN subframe but use next OFDM symbol only (for example, to transmit the MBSFN signal together with the LCT that transmits the PDCCH by using some OFDM symbols of the front). In this case, at the OFDM symbol to which the individual cell channel/signal is only transmitted, the CP length is set equally to the CP length of the normal subframe (S1302). At the OFDM symbol where the individual cell channel/signal is multiplexed with the MBSFN signal, the CP length may be set to the extended CP length (1304) (method 1), or may always be operated by the extended CP to equally maintain the CP length within the same subframe (1306) (method 2). FIG. 13 is a diagram illustrating a method for determining CP length which will be used for MBSFN signal subframe if normal CP is used in a normal subframe. Although omitted in FIG. 13, in case of the NCT, some OFDM symbols at the front, which are not used for transmission of the MBSFN signal at the RB to which the MBSFN signal is transmitted, may be used for transmission of the individual cell channel/signal. In this case, the base station may notify the user equipment that the MBSFN signal is transmitted from what RB by using what OFDM symbol through the upper layer signal such as RRC. The user equipment which is notified may be operated to exclude the region reserved by the MBSFN signal in receiving the channel or signal transmitted from the corresponding RB. In more detail, if the user equipment performs a decoding procedure for the RB to receive the individual cell channel/signal, the OFDM symbol where the MBSFN signal exists on the corresponding RB may be excluded from the decoding procedure for receiving the individual cell channel/signal.

Embodiment 3: CP Length

In the LCT, the same CP length is maintained for a subframe (non-MBSFN subframe or MBSFN subframe at which a unicast signal may be transmitted) for transmission of the unicast signal. However, there is no such restriction in the NCT, whereby more efficient transmission may be performed. For example, the NCT base station may divide the entire subframe into two groups and notify the user equipment that normal CP and extended CP are used in each of the groups. Alternatively, the NCT base station may notify the user equipment of one subframe group and CP configuration (for example, CP length) only applied to one subframe group, and may apply different CP configuration to the other subframe. Afterwards, the user equipment of which channel delay spread is small may be scheduled to be operated at the subframe that uses normal CP, and the user equipment of which channel delay spread is great may be scheduled to be operated at the subframe that uses extended CP. In order to perform this operation more desirably, the user equipment may measure its channel delay spread and report the measured channel delay spread to the base station. Meanwhile, if the entire subframe on the NCT cell is divided into a plurality of groups in accordance with CP configuration (for example, CP length), there may be restriction. For example, subframes #0 and #5, to which a primary synchronization signal (PSS) and a secondary synchronization signal (SSS) are transmitted, assure orthogonality between subcarriers only if CP length used for transmission of the PSS and the SSS is used for the corresponding subframe. Accordingly, if the NCT cell intends to vary the CP length in accordance with the subframe, only the subframe that does not transmits the PSS/SSS may be set to have CP length different from that of PSS/SSS transmission subframe. Accordingly, the PSS/SSS transmission subframe may follow the CP length used for transmission of the PSS and the SSS regardless of CP configuration information based on subframe group information.

In this way, if CP length of a specific cell (that is, NCT cell) is varied depending on the subframe, the NCT cell and its neighboring cell may have their respective CP lengths different from each other at specific subframe timing. However, it is required to equally maintain CP length between neighboring cells at some subframe having a special usage. For example, if a plurality of cells (for example, two cells) are configured to perform a CoMP (Cooperative Multiple Point) joint transmission operation to transmit a signal together, the joint transmission operation cannot be performed at the subframe (timing) at which different CP lengths are set for the plurality of cells, and joint transmission may be performed at the subframe (timing) only at which the same CP length is set for the plurality of cells. For another example, if the user equipment measures CSI-RS or interference of the neighboring cell through RE (for example, zero-power CSI-RS RE) which is being muted by the serving cell, the CP length should be set equally for the subframe at which interference measurement for the neighboring cell is performed. If not so, as it seems to the neighboring cell, which uses another CP length, that location of RE muted by the serving cell is partially overlapped with the plurality of REs, signal or interference of a single RE cannot be measured. In order to provide this operation, the present invention suggests that a cell operated by the NCT should forward information on CP length used by itself to its neighboring cell per subframe. This information may be considered when the neighboring cell (or neighboring base station) configures subframe group in accordance with CP length. Additionally, if the user equipment is configured to measure CSI-RS or interference of the neighboring cell through the muted RE, the present invention suggests that the user equipment should be operated at the subframe for which measurement is performed, to assume that CP length of the neighboring cell is the same as that (that is, CP length of subframe for which measurement is performed by the serving cell) of the serving cell.

In the meantime, the user equipment measures RSRP (Reference Signal Received Power)/RSRQ (Reference Signal Received Quality) of the neighboring cell for the reason of handover preparation, and reports the measured RSRP/RSRQ to the base station. Since RS location of the neighboring cell is varied depending on the CP length, if the neighboring cell varies the CP length in accordance with subframe as described above, the user equipment should know CP length used by a target cell at a specific subframe before performing measurement. In the existing LCT, the PSS and the SSS, which are transmitted for synchronization, are detected, and the CP length of the corresponding cell is identified as CP length applied to the entire subframe through the interval between the signals. However, since the CP length may be varied depending on the subframe as described above, measurement of the neighboring cell cannot be performed by detection only of the PSS/SSS. In order to solve this problem, the present invention suggests that the serving cell notifies the user equipment of CP length owned by the user equipment at the subframe for which RSRP/RSRQ of the neighboring cell is measured, through the upper layer signal such as RRC. The information on the CP length of the neighboring cell, which is forwarded to the user equipment, may be configured on the basis of the information forwarded from the neighboring cell (or base station).

For example, the serving cell may notify the user equipment of two subframe patterns, and may indicate that RSRP/RSRQ should be measured by one pattern on the assumption that the corresponding cells for a series of neighboring cells have normal CP at the corresponding subframe and that RSRP/RSRQ should be measured by the other pattern on the assumption that the corresponding cells for a series of neighboring cells have extended CP at the corresponding subframe. Alternatively, in order to simplify such operation, the serving cell may indicate that RSRP/RSRQ should be measured on the assumption that the serving cell forwards one subframe pattern (together with configuration information on CP length if necessary) and a series of neighboring cells have the same CP length as that of the serving cell at the corresponding subframe. If the subframe for which measurement of the neighboring cell is performed includes the subframe for which the neighboring cell transmits the PSS and/or the SSS, since the subframe may directly detect the PSS/SSS of the neighboring cell and identify the CP length. RSRP/RSRQ of the neighboring cell may be measured without separate assumption of the CP length. If the subframe for which measurement of the neighboring cell is performed includes the subframe for which the neighboring cell does not transmit the PSS and/or the SSS, the CP length of this subframe may be set to be always the same as CP length of the subframe for which the neighboring cell transmits the PSS/SSS, whereby the same CP length may be set for all the subframes for which the user equipment performs measurement.

Embodiment 4: Common Signal Transmission

In addition to the aforementioned CRS or PSS/SSS, a common signal, which should continuously be transmitted to a plurality of user equipments, may exist in the NCT. An example of the common signal includes PBCH for forwarding basis information such as system bandwidth, the number of antenna ports, and system frame number. Since all the user equipments first detects the PBCH before accessing a specific cell (or base station) and initiates a series of network access procedures on the basis of the acquired information, the PBCH should stably be transmitted to all the user equipments. Another example of the common signal includes a common search space (CSS) of a physical control channel. Since the CSS is used to transmit a control signal for random access used during an initial access procedure, control information for scheduling system information which is not included in the PBCH, and control information on a paging signal indicating that incoming call has occurred, the CSS should stably be transmitted to the user equipment together with the PBCH. If the NCT is aggregated with another carrier and used as a secondary carrier, the PBCH and/or the CSS may be transmitted through another aggregated carrier. Accordingly, the PBCH and/or the CSS may occur in the NCT only if the NCT is set to a primary carrier. The PBCH and the CSS of the NCT are different from that of the LCT in that a resource to which the PBCH and the CSS are transmitted is fixed in the LCT but a resource to which the PBCH and the CSS are transmitted is designed variably for more flexible common signal transmission in the NCT. Also, since the common signal is detected as the CRS transmitted from the full-band in the LCT, it is not required to separately designate RS resource information for demodulation of the common signal. However, since a user equipment-specific reference signal (for example, DM RS) selectively transmitted from the resource to which the common signal is transmitted is used for demodulation of the common signal in the NCT, it is difficult for a neighboring cell user equipment to identify the location of the common signal RS without information on the common signal RS.

If the PBCH and/or the CSS are transmitted from the NCT cell, for stable transmission, it is likely that the corresponding signals may be transmitted at high power from a constant location (that is, location of time/frequency resources). This means that the common signal on the NCT cell occurs as continuous interference in the neighboring cell. Accordingly, if the information on the common signal on the NCT cell is transmitted to the neighboring cell through a backhaul link, it may assist appropriate interference mitigation operation in the neighboring cell. For example, the cell that has received the common signal information of the neighboring NCT cell may forward the received information to its user equipments, and the user equipments may perform an operation for removing interference from the common signal of the NCT cell on the basis of the corresponding information.

For example, the NCT cell may forward resource information (location of transmission RB(s) and/or location of transmission subframe(s)) to which the common signal is transmitted and DM RS information (the number of antenna ports of RS, antenna port index, seed for generating DM RS scrambling sequence, etc.) used for demodulation of the common signal to the neighboring cell. Also, such information may be forwarded to the user equipment and then used to receive its signal after the common signal of the NCT cell is detected/removed. In particular, DM RS information on the common signal transmitted from the NCT cell may be very effective for interference removal operation of the neighboring cell user equipment. Since an interference signal based on the PBCH or the CSS is information that may not be notified to the neighboring cell user equipment, interference decoding should first be performed stably to remove interference. However, the DM RS does not require separate interference decoding because an interference signal is notified if generation information is notified. For example, if the user equipment may identify features of the DM RS, which is used, together with the location of the resource to which the PBCH and/or the CSS are transmitted, on the NCT cell, since all the interference features from the DM RS used in the corresponding resource are identified, the user equipment may remove interference from the DM RS and detect its signal. In particular, if the NCT cell and the neighboring cell use the same frequency band, since the DM RS of the NCT cell and the DM RS of the neighboring cell are transmitted from the same RE, interference due to DM RS of the NCT cell may be removed to enable more exact channel estimation, whereby signal detection throughput may be improved significantly. For another example, after measuring the DM RS of the neighboring cell and identifying a direction from which interference of the neighboring cell occurs, the user equipment may perform serving cell signal receiving processing to avoid the corresponding interference direction.

Figure 14:
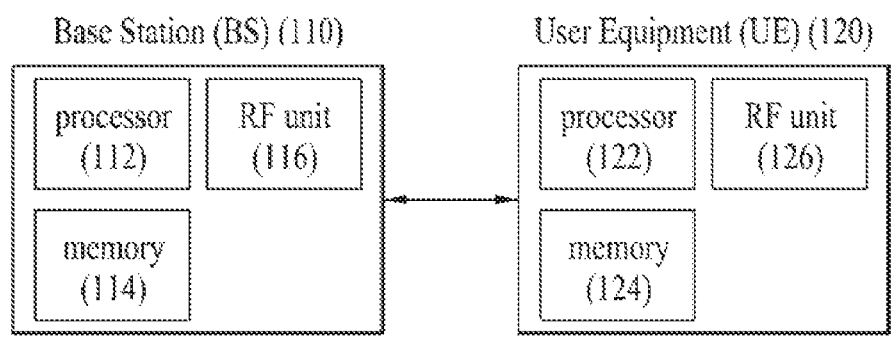
FIG. 14 is a block diagram illustrating a base station and a user equipment according to one embodiment of the present invention.

FIG. 14 is a diagram illustrating a base station and a user equipment, which may be applied to the present invention.

Referring to FIG. 14, the wireless communication system includes a base station (BS) 110 and a user equipment (UE) 120. On a downlink, a transmitter is a part of the base station 110, and a receiver is a part of the user equipment 120. On an uplink, the transmitter is a part of the user equipment 120, and the receiver is a part of the base station 110. The base station 110 includes a processor 112, a memory 114, and a radio frequency (RF) unit 116. The processor 112 may be configured to implement procedures and/or methods suggested in the present invention. The memory 114 is connected with the processor 112 and stores various kinds of information related to the operation of the processor 112. The RF unit 116 is connected with the processor 112 and transmits and/or receives a radio signal. The user equipment 120 includes a processor 122, a memory 124, and a radio frequency (RF) unit 126. The processor 122 may be configured to implement procedures and/or methods suggested in the present invention. The memory 124 is connected with the processor 122 and stores various kinds of information related to the operation of the processor 122. The RF unit 126 is connected with the processor 122 and transmits and/or receives a radio signal. The base station 110 and/or the user equipment 120 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the user equipment and the base station. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station. Node B, eNode B (eNB), and an access point. Also, the user equipment may be replaced with terms such as a mobile station (MS) and a mobile subscriber station (MSS).

The embodiment according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention may be applied to a method and apparatus for performing communication if a plurality of carriers are supported in a wireless communication system.

The invention claimed is:

1. A method of performing a measurement of a cell at a User Equipment (UE) in a wireless communication system, the method comprising:
receiving Reference Signal (RS) information of a neighbor cell, wherein the RS information has no bandwidth information of the neighbor cell; and
mitigating inter-cell RS interference using the RS information of the neighbor cell while performing the measurement of the cell, under assumption that a bandwidth of the neighbor cell is the same as or larger than a bandwidth of the cell.

2. The method of claim 1, wherein the mitigation of the inter-cell RS interference is performed over a bandwidth being the same as or larger than the bandwidth of the serving cell.

3. The method of claim 1, wherein the RS information includes allocation information indicating a subframe set related with RS transmission of the neighbor cell.

4. The method of claim 3, wherein the mitigating is performed on one or more subframes used for RS transmission based on the allocation information.

5. The method of claim 1, wherein a center frequency of the neighbor cell is the same as a center frequency of the cell.

6. The method of claim 1, wherein the RS information includes Cell-specific RS (CRS) information, and the inter-cell RS interference includes inter-cell CRS interference.

7. The method of claim 1, wherein the performing of the measurement of the cell includes measuring downlink signals of the cell.

8. The method of claim 1, wherein the performing of the measurement of the cell includes generating Channel Status Information (CSI) of the cell.

9. A User Equipment (UE) configured to perform a measurement of a cell in a wireless communication system, the UE comprising:
a Radio Frequency (RF) unit; and
a processor that,
receives Reference Signal (RS) information of a neighbor cell, wherein the RS information has no bandwidth information of the neighbor cell, and
mitigates inter-cell RS interference using the RS information of the neighbor cell while performing the measurement of the cell, under assumption that a bandwidth of the neighbor cell is the same as or larger than a bandwidth of the cell.

10. The UE of claim 9, wherein mitigation of the inter-cell RS interference is performed over a bandwidth being the same as or larger than the bandwidth of the serving cell.

11. The UE of claim 9, wherein the RS information includes allocation information indicating a subframe set related with RS transmission of the neighbor cell.

12. The UE of claim 9, wherein the mitigating is performed on one or more subframes used for RS transmission based on the allocation information.

13. The UE of claim 9, wherein a center frequency of the neighbor cell is the same as a center frequency of the serving cell.

14. The UE of claim 9, wherein the RS information includes Cell-specific RS (CRS) information, and the inter-cell RS interference includes inter-cell CRS interference.

15. The UE of claim 9, wherein the performing of the measurement of the cell includes measuring downlink signals of the cell.

16. The UE of claim 9, wherein the performing of the measurement of the cell includes generating Channel Status Information (CSI) of the cell.

* * * * *